(12) United States Patent
Liu et al.

(10) Patent No.: US 7,096,209 B2
(45) Date of Patent: Aug. 22, 2006

(54) GENERALIZED SEGMENTATION METHOD FOR ESTIMATION/OPTIMIZATION PROBLEM

(75) Inventors: Tongwei Liu, Redwood City, CA (US); Dirk M. Beyer, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 09/854,084

(22) Filed: May 10, 2001

(65) Prior Publication Data

US 2002/0188579 A1    Dec. 12, 2002

(51) Int. Cl.
*G06F 17/10* (2006.01)
*G05B 13/00* (2006.01)

(52) U.S. Cl. .......................................... 706/19; 706/20
(58) Field of Classification Search ............ 706/19–21, 706/59; 705/14, 26
See application file for complete search history.

(56) References Cited

U.S. PATENT DOCUMENTS

| | | | | |
|---|---|---|---|---|
| 5,377,307 A | * | 12/1994 | Hoskins et al. | 706/19 |
| 5,442,730 A | * | 8/1995 | Bigus | 706/19 |
| 5,452,400 A | * | 9/1995 | Takahashi et al. | 706/19 |
| 5,675,711 A | * | 10/1997 | Kephart et al. | 706/12 |
| 5,727,950 A | * | 3/1998 | Cook et al. | 434/350 |
| 5,930,803 A | * | 7/1999 | Becker et al. | 707/104.1 |
| 6,038,556 A | * | 3/2000 | Hutchison | 706/25 |
| 6,085,184 A | * | 7/2000 | Bertrand et al. | 706/45 |
| 6,185,543 B1 | * | 2/2001 | Galperin et al. | 705/38 |
| 6,278,989 B1 | * | 8/2001 | Chaudhuri et al. | 707/2 |
| 6,308,162 B1 | * | 10/2001 | Ouimet et al. | 705/7 |
| 6,345,239 B1 | * | 2/2002 | Bowman-Amuah | 703/6 |
| 6,490,572 B1 | * | 12/2002 | Akkiraju et al. | 706/19 |
| 6,731,990 B1 | * | 5/2004 | Carter et al. | 700/52 |

OTHER PUBLICATIONS

E. Chalom, V.M. Bove Jr.; "Segmentation of an image sequence using multi-dimensional image attributes"; 1996. Proceedings International Conference on Image Processing; Sep. 16-19, 1996 □□; pp. 525-528 vol. 2.*

P.S.Georgilakis, N.D.Hatziargyriou, A.D.Doulamis, N.D.Doulamis, S.D.Kollias; "A neural network framework for predicting transformer core losses"; Proceedings of the 21st 1999 □□IEEE International Power Industry Computer Applications; Jul. 1999; pp. 301-308.*

Georgilakis et al; "A neural network framework for predicting transformer core losses"; Proceedings of the 21st 1999 IEEE International Power Industry Computer Applications; Jul. 1999; pp. 301-308.*

(Continued)

*Primary Examiner*—Anthony Knight
*Assistant Examiner*—Nathan H. Brown, Jr.

(57) ABSTRACT

A method for action selection based upon an objective of an outcome relative to a subject. In one embodiment, a training set is obtained that contains attributes of a subject. In the present embodiment, a best behavioral model for predicting an outcome when a subject has an action applied is calculated. The training set is mapped to the best behavioral model. The mapping provides a base from which a random sub-sample is acquired. In the present embodiment, a random sub-sample of the training set and the best behavioral model is then selected. This random sub-sample reduces the computational requirements when determining an optimized strategy. The optimized strategy provides an optimal action relative to the subject for the objective of the outcome. In one embodiment, the subject is a customer of a business entity, enabled to interact with the customer, and an action is a promotion offered by the business entity.

16 Claims, 6 Drawing Sheets

OTHER PUBLICATIONS

Mangasarian; "Breast Cancer Diagnosis via Linear Programming"; Computational Science and Engineering, IEEE [see also Computing in Science & Engineering]; vol. 2, Iss. 3; Fall 1995; pp. 70-71.*

Mangasarian; Multisurface method of pattern separation; Information Theory, IEEE Transactions on; vol. 14, Iss. 6; Nov. 1968; pp. 801-807.*

Chalom et al; "Segmentation of an image sequence using multi-dimensional image attributes"; 1996. Proceedings International Conference on Image Processing; Sep. 16-19, 1996; pp. 525-528 vol. 2.*

Bradley et al; Parsimonious side propagation; Acoustics, Speech, and Signal Processing, Proceedings of the 1998 IEEE International Conference on;, vol. 3, May 12-15, 1998; pp. 1873-1876.*

Mangasarian et al; Successive overrelaxation for support vector machines; Neural Networks, IEEE Transactions on; vol. 10, Iss. 5; Sep. 1999; pp. 1032-1037.*

Oten et al; A new structure-preserving dimensionality reduction approach and Ol-net implementation; IEEE International Joint Conference on Neural Networks Proceedings; IEEE World Congress on Computational Intelligence; vol. 1; May 4-9, 1998; pp. 690-694.*

Yumoto et al; Customization rule generation for electronic sales promotion system in wholesale industry; International Conference on Advance Issues of E-Commerce and Web-Based Information Systems; Apr. 8-9, 1999; pp. 50-55.*

* cited by examiner

GENERALIZED SEGMENTATION METHOD FOR ESTIMATION/OPTIMIZATION PROBLEM

FIELD OF THE INVENTION

The present invention relates to a method for basing an action upon subjects to achieve a particular outcome. More particularly, the present invention provides a method for determining an optimal action predicated upon multi-attributed subjects for maximization of specific objective functions relative to the outcome.

BACKGROUND OF THE INVENTION

Computer systems and their related technologies that are currently available enable the acquisition and storing of nearly endless amounts of data and information regarding a seemingly endless variety of subject matter. Those systems and technologies also enable the acquired data and information to be categorized and classified according to an almost limitless selection of attributes.

Accordingly, numerous methods have been implemented to utilize the acquired data and information for purposeful interpretation. To provide purposeful interpretation of data and information acquired, numerous methods have been implemented in an attempt to provide an optimal action as a response to particular sets of criterion relative to a customer. Referring to the various methods that are commonly utilized, each has focused primarily on one particular approach to interpretation and utilization of the outcome to provide the optimal action relative to a particular subject. It should be appreciated that each method is not without certain drawbacks.

In a first example, one method calculates the estimated objective function for nearly any of the possible actions and simply selects the one with maximum value. In this example, each subject is a customer who has accessed a company's Web site for a particular reason. In this same example, an action is something promoted by a company, such as, for example, something for sale. While this approach provides complete flexibility for the estimation, it uses a "greedy algorithm" for finding the optimal allocation strategy. A greedy algorithm is in reference to the manner in which the optimal action is derived. It bases the decision solely on a single factor, such as e.g., profit. For example, assume a company is selling computers, and each of the computers comes with different configurations and prices dependent upon those configurations. In this instance, the optimal action, the selling of the computer, would be based on the computer with the highest selling price and, in one example, the largest amount of profit. By essentially ignoring any business side constraints such as, e.g., budget, inventory levels, projected sales, shipping costs, and the optimal action can produce results that are far from being optimal.

In a second example, a customer is placed into several groups using, for instance, a clustering algorithm or supervised learning. The customers within a particular grouping are then treated as homogenous in their response to nearly any action. This enables solving the optimization problem with a finite number of groupings. For each new customer, the appropriate groups are determined, and the optimal action for those groups are applied to that new customer. While this approach provides for a wider range than that of the optimal action based on maximum value, it restricts the estimation to be only of a segmentation type. A segmentation type of estimation may not provide an optimal action for a given application. It is well known in the art that estimators derived and/or obtained from a generalized linear regression or from a neural network are not analogous to the segmentation type.

Additionally, to ensure that the sample size is sufficient to estimate the outcome within each of the groups in the segmentation type of estimation, the total number of groups must be kept rather small. However, to find a segmentation where the customers of each group are homogenous to almost all the optimum action possibilities would be very unlikely.

In another example, numerous complex procedures are utilized to attempt to estimate the joint distribution of the estimated outcome space. This approach suffers from the inherent complexity of performing the complex procedures, but also from the fact that it is quite difficult to provide estimation based upon a high dimensional distribution.

Thus a need exists for a method of estimation and optimization of an action on subjects that is based on an objective of an outcome which incorporates attributes relative to each subject. A further need exists for a method that considers each subject as a separate segment. An additional need exists for a method which includes business side constraints. Additionally, a need exists for a method that reduces the computational complexity normally associated with previous methods. Further, a need exists for a method that incorporates full flexibility into the estimation function. Another need exists for a method that can separate the estimation portion from the optimization portion, so as to strike a balance between optimality and tractability.

The present invention provides a unique, novel solution to those and other problems.

SUMMARY OF THE INVENTION

The present invention provides a method of estimation and optimization of an action on subjects that is based on an objective of an outcome which incorporates attributes relative to each subject. The method of present invention further provides a method that considers each subject as a separate segment. Additionally, the present invention provides a method which includes business side constraints. Further provided by the present invention is a method that reduces the computational complexity normally associated with previous methods. Additionally, a further need exists for a method that incorporates full flexibility into the estimation function. Another need exists for a method that can separate the estimation portion from the optimization portion, so as to strike a balance between optimality and tractability.

Accordingly, the present invention provides a method for action selection based upon an objective of an outcome relative to a subject. In one embodiment, a training set in obtained. The training set is an existent database containing information. The information within the database are attributes relative to a subject. In the present embodiment, a best behavioral model is calculated and stored. The best behavioral model assists in predicting an outcome when an action is applied to a subject. In the present embodiment, the training set is mapped to the best behavioral model. The mapping provides a base from which a sub-sample may be acquired. Accordingly, in the present embodiment, a random sub-sample is then selected and stored. The random sub-sample reduces the requirements of the complex computations in comparison to those needed by the training set. In the present embodiment, an optimized strategy for the random sub-sample is determined and stored. The optimized strategy provides an optimal action relative to the subject for the objective of the outcome. In one embodiment, the subject is a customer of a business entity, enabled to interact with the customer, and an action is a promotion offered by the business entity.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
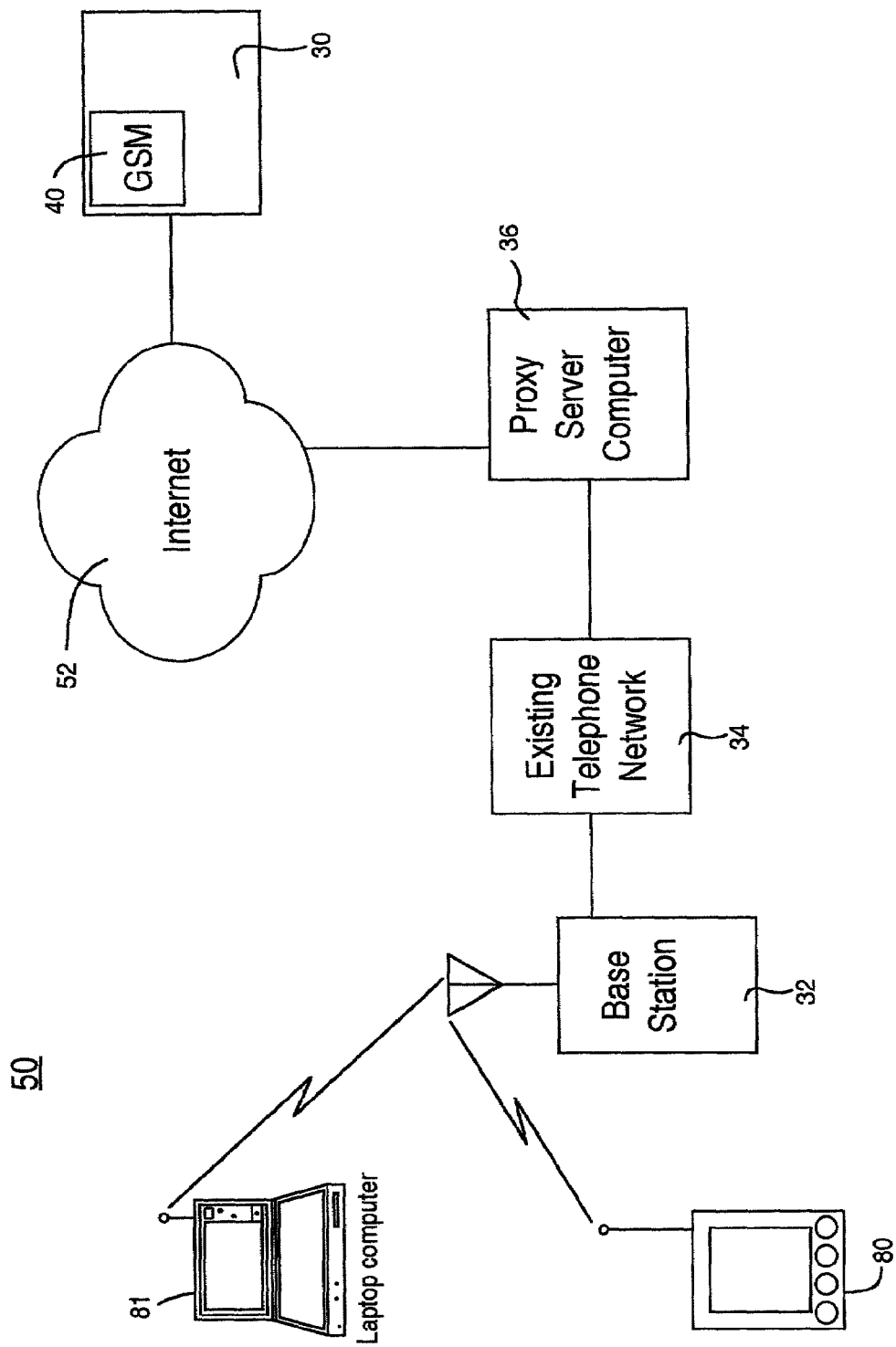
FIG. 1 is an illustrated block diagram of an exemplary computer network, in accordance with one embodiment of the present invention.

A method for determining optimal action predicated upon multi-attribute subjects for the maximization of certain objective functions of a particular outcome. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "calculating" or "mapping" or "acquiring" or "selecting" or "storing" or "allocating" or "deriving" or "providing" or "optimizing" or "interpreting" or "classifying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of anticipatory actions based upon defined and categorized subjects relative to a specific outcome within a web-based environment. However, it is appreciated that the present invention can be used with other types of environments that have the capability to utilize data and information relative to a subject for a desired result, including but not limited to web based environments.

For purposes of the present application, the term "handheld computer system" is not limited solely to conventional handheld or palmtop computers. Instead, the term "handheld computer" or "handheld computer system" or "palmtop computer system" is also intended to include any mobile device, which can be used to communicate with a network. Such mobile devices include but are not limited to pagers and paging systems, wireless and cellular telephones, electronic address books, and numerous other mobile devices which have the ability to communicate with a network or other computers, either through a wired or wireless connection. As such, for purposes of the present application, the terms "handheld computer" and "palmtop device" and "palmtop computer system" will be considered synonymous and will be used interchangeably throughout the present application.

For purposes of the present application, the term "laptop computer" or laptop computer system" is intended to include any easily transportable computer system that is not classified as a "palmtop computer, or handheld computer, or handheld computer system." Furthermore, the "laptop computer" is configured such that it has the ability to communicate with a network or other computer systems, either through a wired connection e.g., a modem or NIC (network interface card) and the like, or through a wireless connection.

For purposes of the present application, the term "desktop computer" or "desktop computer system" is intended to include those computer systems that are not easily transportable, e.g., a desktop computer system or a computer workstation and the like. Furthermore, the "desktop computer" is configured such that it has the ability to communicate with a network or other computers, either through a wired connection e.g., a modem or a NIC (network interface card) and the like, or through a wireless connection.

For purposes of the present application, the term "client" is not limited solely to an individual, company, or organization. Instead, the term "client" is also intended to include any "subject" or "customer" who/which can communicate with another individual, organization, and/or company utilizing a computer network. As such, for purposes of the present application, the terms "client" and "subject" and "customer" will be considered synonymous and will be used interchangeably throughout the present application.

EXEMPLARY NETWORK ENVIRONMENT

FIG. 1 is a block diagram of an exemplary network environment 60 including a portable computer system 80, a laptop computer system 81 and server 30, in which is located the present invention, the GSM (generalized segmentation method) 40, in one embodiment of the present invention. Base station 32 can be both a transmitter and receiver base station, which can be implemented by coupling it into an existing public telephone network 34. Implemented in this manner, base station 32 enables portable computer system 80 and/or laptop computer system 81 to communicate with a proxy server computer system 36, which is coupled by wire to the existing public telephone network 34. Furthermore, proxy server computer system 36 is coupled to the Internet 52, thereby enabling portable computer system 80 and/or laptop computer system 81 to communicate with the Internet 52 thereby enabling access to GSM (generalized segmentation method) 40 located within server 30. When communicating with a web site over Internet 52, protocols such as CTP (Compact Transport Protocol), CML (Compact Markup Language) and WAP (Wireless Area Protocols) which allows the use of UDP (User Datagram Protocol), and markup languages such as HTTP (Hypertext Transfer Protocol), HTML (Hypertext Markup Language), WML (wireless markup language) which includes HDML (handheld device markup language) can be utilized by portable computer system 80, laptop computer 81, and/or desktop computer system 82 of FIG. 2, in the present embodiment.

It should be appreciated that one of the functions of proxy server 36 is to perform operations over the Internet 52 on behalf of portable computer system 80 and/or laptop computer 81. For example, proxy server 36 has a particular Internet address and acts as a proxy device for portable computer system 80 and/or laptop computer system 81 over the Internet 52.

It should be further appreciated that other embodiments of a communications network, planned or envisioned, may be utilized in accordance with the present invention. For example, a wireless connection may be made from portable computer system 80 and/or laptop computer system 81 directly to the Internet 52 to access GSM (generalized segmentation method) 40 located within server 30.

The data and information, communicated between base station 32 and portable computer system 80 and/or laptop computer system 81, are the same type of information and data that can conventionally be transferred and received over a public telephone wire network system. Additionally, in FIG. 1, the existing telephone network could also be a packet-based network, as is utilized by some computer systems. However, a wireless communication interface is utilized to communicate data and information between portable computer system 80 and/or laptop computer system 81 and base station 32. Furthermore, nearly any wireless network can support the functionality to be disclosed herein.

Figure 2:
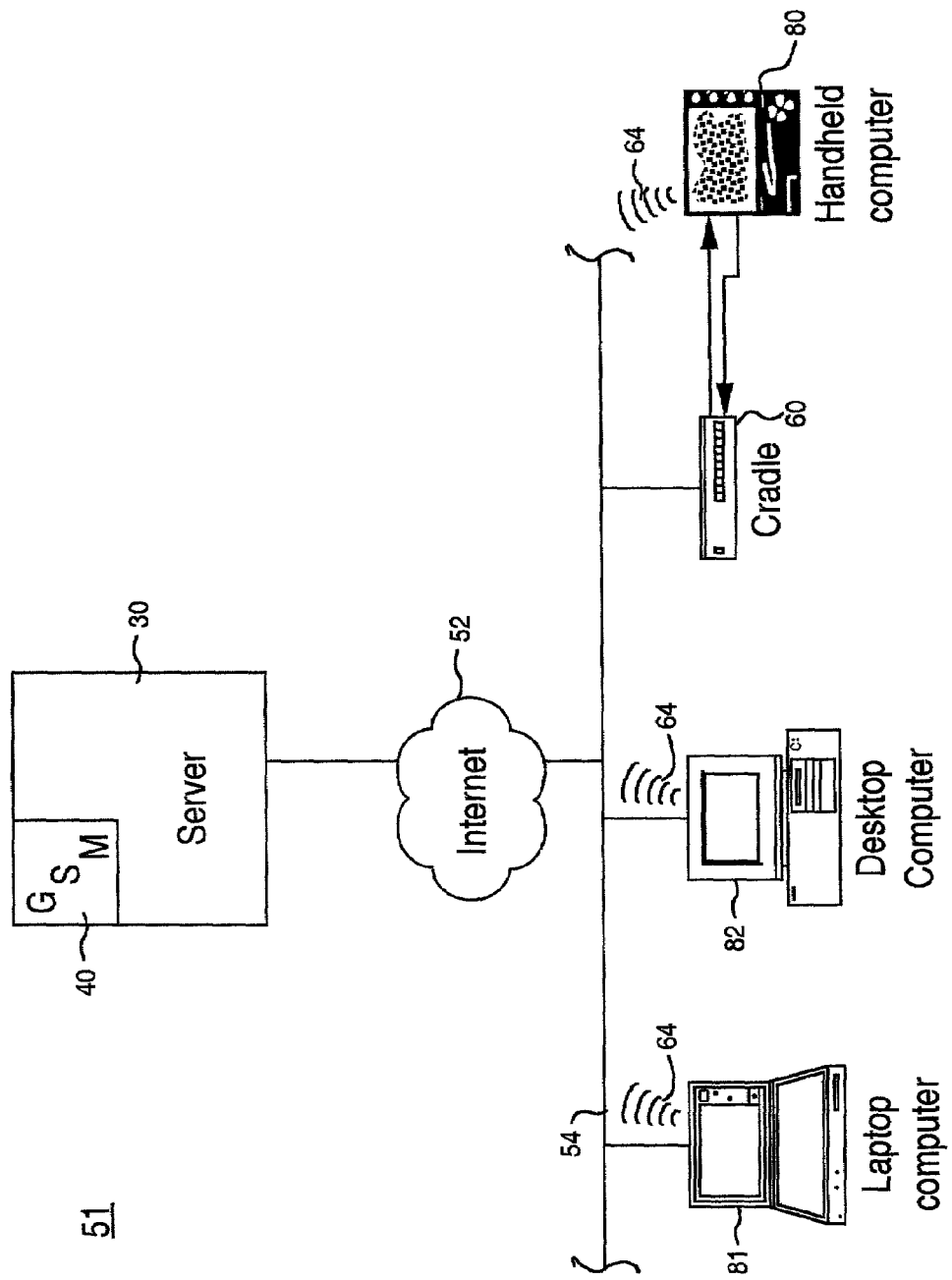
FIG. 2 is an illustrated block diagram of an exemplary network environment including a portable computer system in accordance with one embodiment of the present invention.

FIG. 2 illustrates another embodiment of a system 51 that can be used in conjunction with various embodiments of the present invention. System 51 is shown to include a desktop computer system 82, a laptop system 81, a handheld computer system 80, Internet 52, and sever 30, in which is located GSM (generalized segmentation method) 40. Optionally, one or more desktop, laptop, and/or handheld computer systems can be used within system 51. Desktop computer system 82 and laptop computer 81 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52, using a number of well-known protocols, to provide access to GSM (generalized segmentation method) 40 located within server 30.

Importantly, bus 54 is also coupled to a cradle 60 for receiving and initiating communication with handheld computer system 80. Cradle 60 provides an electrical and mechanical communication interface between bus 54 (and anything coupled to bus 54) and handheld computer system 80 for two-way communications. Handheld computer system 80 may instead be coupled to desktop computer system 82 and/or laptop computer system 81 via a wireless (radio) connection. Handheld computer system 80, laptop computer system 81, and/or desktop computer system 82 may also contain a wireless infrared communication mechanism 64 for sending and receiving information from other devices.

With reference to both FIGS. 1 and 2, it is appreciated that handheld computer system 80, laptop computer system 81, and/or desktop computer system 82, can be used in a network environment combining elements of networks 50 and 51. That is, handheld computer system 80, laptop computer system 81, and/or desktop computer system 82 can include both a wireless infrared communication mechanism and a signal (e.g., radio) receiver/transmitter device.

It should also be appreciated that, in one embodiment of the present invention wherein server 30 is disposed internal of an Intranet network configuration (located within the firewall of an organization or corporation), Internet 52 is not required for access to GSM (generalized segmentation method) 40 located within server 30. Desktop computer system 82, laptop computer system 81, and/or handheld computer system 80 may be communicatively coupled to server 30 and GSM 40, through bus 54. Bus 54 may be configured as a network communication line, e.g., a local area network (LAN), a wide area network (WAN), a metropolitan area network (MAN), or most other network configurations that enable communication between computers.

The mechanisms for communicatively coupling computer systems over the Internet or over Intranets are well known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). GSM (generalized segmentation method) 40, located within server 30, may be accessed through a series of connected hubs, routers, bridges, and switches, configured to provide access to server 30 which contains GSM (generalized segmentation method) 40. It should be further appreciated that other embodiments of a communications network, planned or envisioned, may be utilized in accordance with the present invention.

EXEMPLARY COMPUTER SYSTEM

Figure 3:
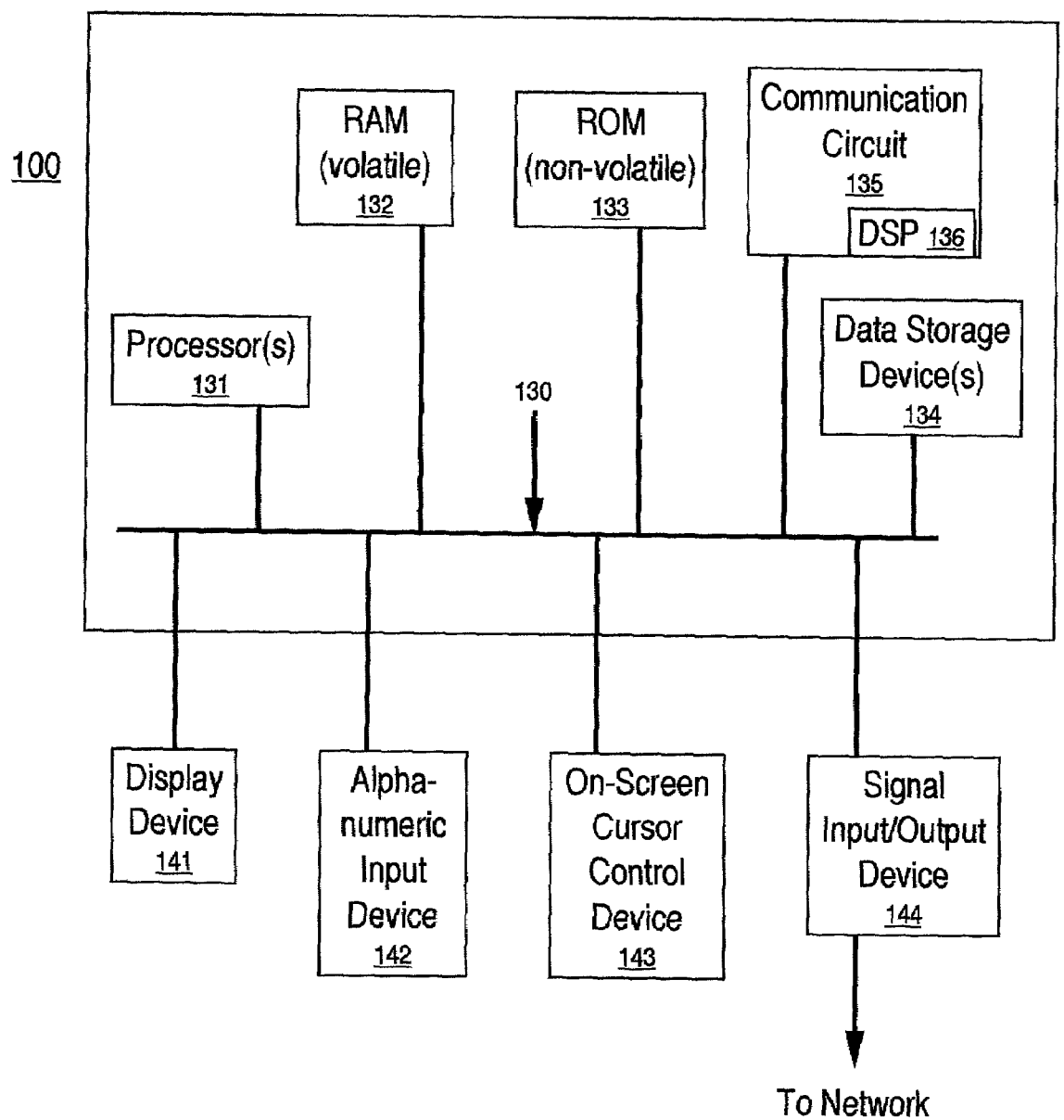
FIG. 3 is a block diagram of a computer system upon which embodiments of the present invention may be practiced, in accordance with one embodiment of the present invention.

FIG. 3 is a logical block diagram that illustrates circuitry of an exemplary computer system 100, which can be implemented within handheld computer system 80, laptop computer system 81, desktop computer system 82, and/or server 30 upon which embodiments of the present invention may be practiced. Computer system 100 includes an address/data bus 130 for communicating information and at least one central processor 131 coupled with the bus for processing information and instructions. Also included is volatile memory 132 (e.g., random access memory, RAM) which is coupled with the bus 130 for storing information and instructions for the central processor 131. Further included is a non-volatile memory 133 (e.g., read only memory, ROM) coupled with the bus 130 for storing static information and instructions for the processor 131. Computer system 100 also includes at least one data storage device 134 coupled with the bus 130 for storing information and instructions. Data storage device 134 can be, for example, an HDD (hard disk drive), an FDD (floppy disk drive), a memory stick, a CD-RW (compact disk with write functionality), a tape drive, etc., and furthermore device 134 can be in multiples or in a combination thereof. Data storage device 134 may also be removable or hot swappable (connected or unconnected while computer is powered).

With reference still to FIG. 3, computer system 100 also includes a signal transmitter/receiver device 144, which is coupled to bus 130 for providing a physical communication link between computer system 100, and a network environment (e.g., network environments 50 and 51 of FIGS. 1 and 2, respectively). As such, signal transmitter/receiver device 144 enables central processor unit 131 to communicate with other electronic systems coupled to the network. It should be appreciated that the present embodiment of signal transmitter/receiver device 144 is well suited to be implemented in a wide variety of ways. In one example, signal transmitter/receiver device 144 is coupled to an antenna and provides the functionality to transmit and receive information over a wireless communication interface. In another example, signal transmitter/receiver device 144 could be implemented as a modem. In yet another example, device 144 could be configured as a NIC (network interface card).

In FIG. 3, in one embodiment, computer system 100 includes a communication circuit 135 coupled to bus 130. Communication circuit 135 includes an optional digital signal processor (DSP) 136 for processing data to be transmitted or data that are received via signal transmitter/receiver device 144. Alternatively, processor 131 can perform some or all of the functions performed by DSP 136.

As described above, computer system 100 also contains a display device 141 coupled to the bus 130 for displaying information to the computer user. Display device 141 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), electronic paper display, plasma, etc., on screen cursor device 143.

Computer system 100 of FIG. 3 also includes an optional cursor control or directing device (on-screen cursor control 143) coupled to bus 130 for communicating user input information and command selections to processor 131. Many implementations of the cursor control device are known in the art including a trackball, mouse, joystick or special keys on alphanumeric input device 142 capable of signaling movement of a given direction or manner of displacement. It is to be appreciated that the cursor control 143 also may be directed and/or activated via input from the keyboard using special keys and key sequence commands. Alternatively, the cursor may be directed and/or activated via input from a number of specially adapted cursor directing devices.

In one implementation, e.g., when utilized in handheld computer system 80, on-screen cursor control device 143 is a touch screen device incorporated with display device 141. On-screen cursor control device 143 is capable of registering a position on display device 141 where the stylus makes contact. In another implementation, e.g., when utilized in laptop computer system 81, on-screen cursor control device 143 is a touch pad, or, in another implementation, a finger activated push stick. In another implementation, e.g., when utilized in desktop computer system 82, on-screen cursor control device 143 is a mouse or similar pointing device.

As described above, computer system 100 also contains a display device 141 coupled to the bus 130 for displaying information to the computer user. Display device 141 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), electronic paper display, plasma, etc., for display device 141.

EXEMPLARY CLIENT/SERVER ENVIRONMENT

Figure 4:
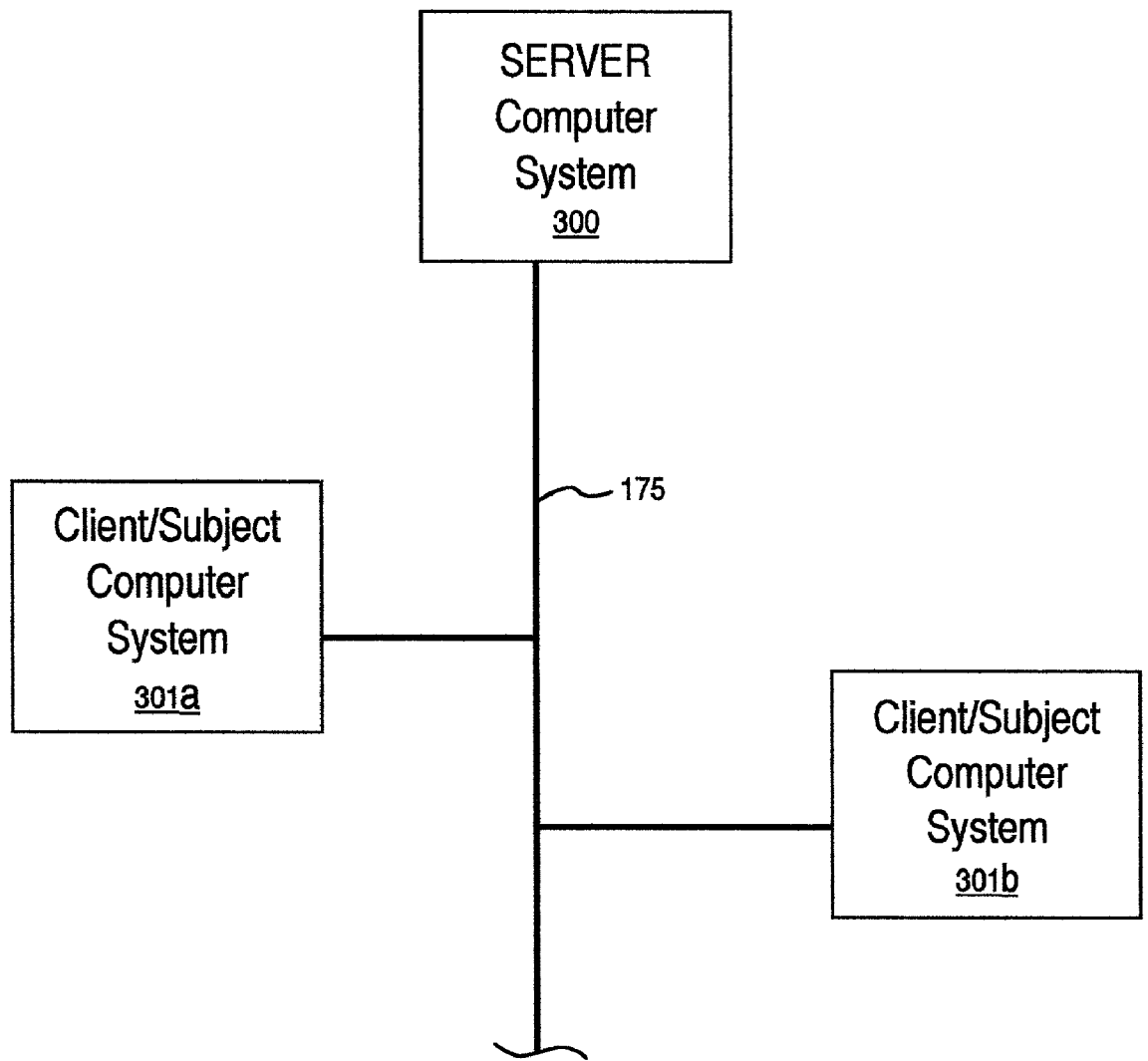
FIG. 4 is an illustrated block diagram of an exemplary client/subject-server network environment, upon which embodiments of the present invention may be practiced.

FIG. 4 is a block diagram illustrating an exemplary client-server computer system network 299 upon which embodiments of the present invention may be practiced. Network 299 may be a communication network located within a firewall of an organization or corporation (an "Intranet"), or network 299 may represent a portion of the World Wide Web or Internet. Client/subject (or user/customer) computer systems 301a and 301b and server computer system 300, wherein GSM (generalized segmentation method) 40 is disposed, are communicatively coupled via communication lines 175; the mechanisms for communicatively coupling computer systems over the Internet or over Intranets are well-known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). Alternatively, client/subject computer systems 301a and 301b can be coupled to server computer 300 via an input/output port (e.g., a serial port) of server computer system 300; that is, client/subject computer systems 301a and 301b and server computer system 300 may be non-networked devices. Though network 299 of FIG. 4 is shown to include one server computer system 300, it is appreciated that more than one server computer system 300 can be used. Further, it should also be appreciated that although FIG. 4 is shown to include two client/subject computer systems, 301a and 301b, respectively, it is appreciated that literally thousands of client/subject computer systems may be coupled with server 300.

In general, the layout language for a Web site and/or document is HTML (hypertext markup language); although other markup languages such as, e.g., XML (extensible markup language) or WML (wireless markup language) may be utilized in developing Web sites and their associated documents. Web sites and the related documents are stored in HTML format in association with "server" software on remote servers. A Web site and/or documents are given URLs (uniform resource locators) which are essentially address paths identifying the server which hosts the particular Web site and/or related documents plus the location of the site and documents on the server. Using "browser" software, an end-user (client/subject) can send a request from a client/subject computer to access a Web site or an individual document within the Web site stored at a particular URL. Browser software such as NETSCAPE™ NAVIGATOR™, of Netscape Communications Corporation of Mountain View, Calif., is well known and widely available. When the server receives the client/subject's request, it sends the requested HTML Web site or document to the client where the Web site and/or document can be displayed. The communication protocol used in making such a request and in transferring Web documents is "Hypertext Transfer Protocol" (HTTP).

ACQUISITION OF CLIENT/SUBJECT DATA

When a subject/customer visits an organization's, company's, or individual's Web site, information regarding that customer's behavior and tendencies can easily be obtained and then stored within a database. The information about the customer that is stored in the database may range from a few attributes to possibly hundreds of attributes regarding that customer. An attribute, also commonly termed a field, can be nearly any applicable characteristic or qualifying feature relative to that customer, such as, the customer's name, address, age, gender, income, occupation, their employer (if applicable), and their employer's location. Other attributes may also include the frequency with which they visit the Web site or the amount of money a particular customer usually spends per visit. Additional attributes may include a list of products utilized by the client/customer, which may include the respective model numbers, the dates of acquisition, replacement parts or refills ordered, repairs required on those products, and the like. Additional attributes may include the time and day of the week that the customer is most likely to visit, whether the customer is receptive to promotions from the company, and the tendencies to accept or reject promotions with regard to products that the customer may or may not own. Further, attributes may include personal preferences or characteristics such as, whether the customer is left or right handed, the customer's ethnicity, their favorite color, a favorite food, and the like.

It should be appreciated that the above list of attributes should not be considered exhaustive, but is used to illustrate the large variety of attributes and characteristics that may be utilized within a database. It should be further appreciated that a list of attributes and/or characteristics can be nearly endless, although limited, in part, by the amount of data desired to be obtained, and the projected amount of time spent obtaining and processing the data in conjunction with the data storage capacity limitations of the facility wherein the database resides.

It should be further be appreciated that because fields in a particular large all-encompassing database may or may not contain the characteristics/criteria deemed necessary and/or the large database may have fields with irrelevant information not needed to provide an accurate base upon which the present invention may be practiced, a smaller database may need to be developed incorporating those criteria which are critical to providing an accurate and realistic data sample relative to the desired outcome. It should be appreciated that in certain circumstances, the fields of one database may not directly translate to the corresponding fields of another database. Therefore, in some cases, an intermediary or translator database may be required to convert the data, which, in one database may be represented in one manner, to another database, which represents the data in a different manner. The present invention can utilize the functionality of nearly any database program that is designed to enable classification, organization, and analyzation characteristics/criteria in database fields for assimilation.

GENERALIZED SEGMENTATION METHOD

The following paragraph is a general overview of the present invention, a GSM (generalized segmentation method). The general overview will be followed with an in-depth detailed description of the present invention.

General Overview

In one embodiment of the present invention, a training set is acquired and stored. The training set is an existent database containing attributes of the subjects/customers. A best behavioral model, represented as a function, is then calculated and stored. The training set is then mapped to the best behavioral model, where each subject of the training set is a separate point in a BMS (business metric space). A random sub-sample of the mapping of the training set to the best behavioral model, separate points in the BMS (business metric space) is taken so as to reduce the computational requirements when determining an optimized strategy. An optimized strategy for the sub-sample is then determined. This provides the optimum action, relative to the subject, that achieves the objective of the outcome. The function (best behavioral model) and the optimal action, for each subject in the random sub-sample represented by a point in a business metric space, is stored as a result. This result is then applied to a new subject, which provides an optimal action.

Generalized Segmentation Method

Figure 5:
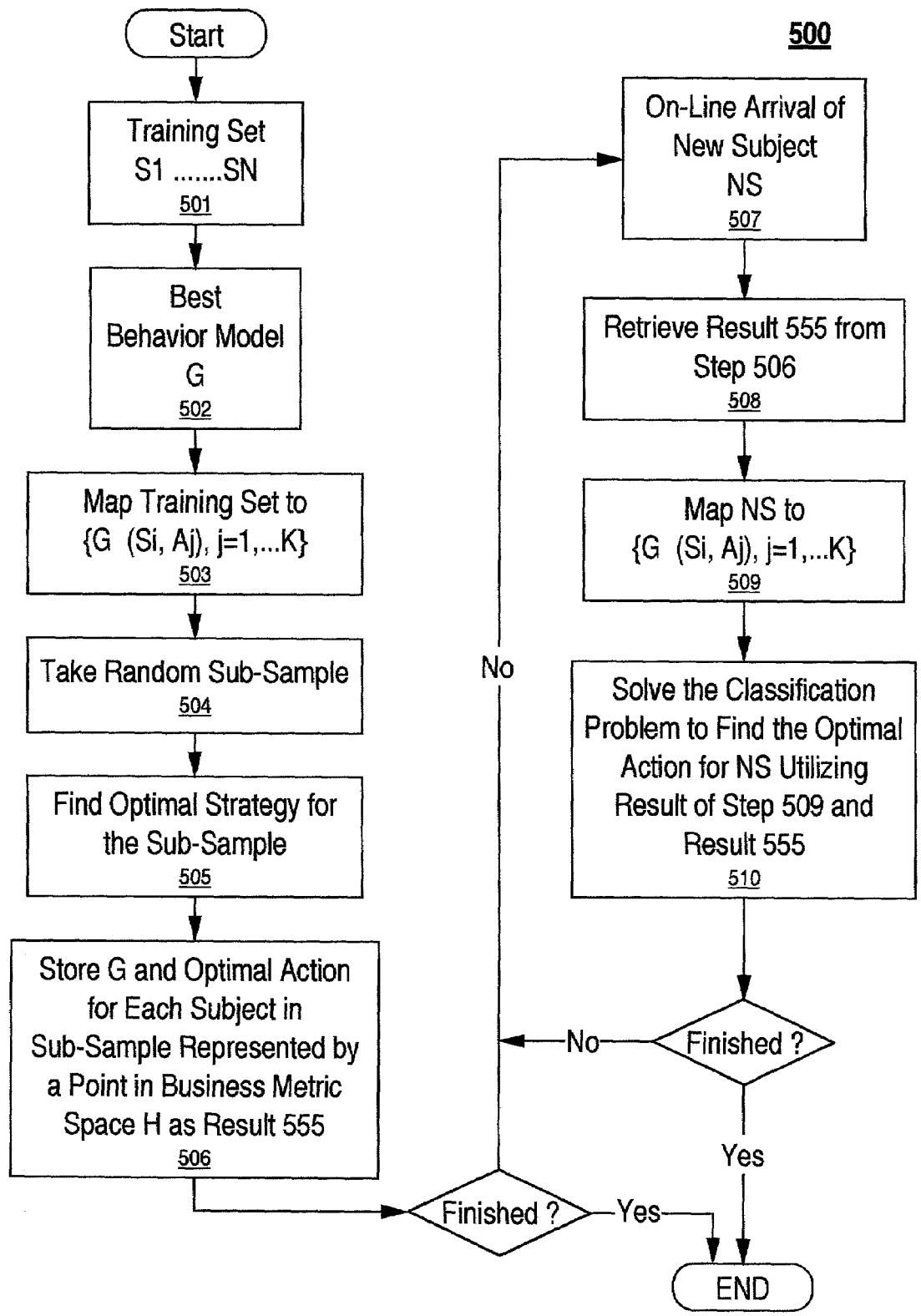
FIG. 5 is a flowchart showing the steps in a process for utilizing a generalized segmentation method to estimate an optimal action based upon a multi-attributed subject to maximize certain objective functions relative to a preferred outcome, in one embodiment of the present invention.

FIG. 5 is a flowchart depicting the steps in a process 500 for a GSM (generalized segmentation method) 40, in one embodiment of the present invention. In this embodiment, process 500 is implemented by computer system 100 (FIG. 3) as computer-readable program instructions stored in a memory unit (e.g., ROM 133, RAM 132, or data storage device 134 of FIG. 3) and executed by a processor (e.g., processor 131 of FIG. 3). However, it is appreciated that some aspects of process 500 may be implemented on one computer system, with other aspects of process 500 performed on another. For example, the training set (as described in step 501 of FIG. 5) may be obtained from one computer, while the calculating and storing of a best behavioral model (as described in step 502 of FIG. 5) may be performed on another. It is further appreciated that the steps in process 500 may be performed in an order different from that described.

It should be appreciated that it is data that is stored within fields of a database that provides the base of information to be utilized in the present invention, a GSM (generalized segmentation method) 40. GSM 40 provides an estimate of an optimal action based upon multi-attributed subjects and optimizes that action as a maximization of certain objective functions of a desired outcome.

In one example of one embodiment of the present invention, a company's main concern is profit, an illustration of a desired outcome. In this example, a contributing factor to a company's profit is the percentage of discount that needs to be offered to each of their customers before they will be receptive to a particular promotion. A customer's income, age, and education illustrate attributes of the subject and the discount illustrates an action that may be applied to the subject.

Subsequent to the determination of the fields that will be utilized in the GSM (generalized segmentation method), there is structure to the database, with respect to previous customer's behavioral patterns. The data containing the previous behavioral patterns of the customers are converted into vectors of numbers which become a training set, upon which the actions of the GSM, in part, are based.

It should be appreciated that (a) promotion(s) offered to a customer is/are also converted into vectors of numbers, which become a possible action set, thereby enabling the GSM 40 to incorporate both the training set and the possible action set into the determination of the optimal action. Both the training set and the possible action set are vectors of numbers. In this manner, the present invention can predict a response from a particular customer who is offered a particular promotion.

To illustrate, step 501 of FIG. 5 shows a training set for subjects S1 to SN, where subject S equates to a subject or customer, in one embodiment of the present invention. It should be appreciated that for each Si, there is a dimensional attribute vector. Further, the possible action set is from A1 to AK, where A equates to an action. Assume that for each pair, (Si,Aj), there is G(Si,Aj), which is the estimated outcome for applying action Aj upon subject Si, where Si is a three dimensional vector.

In the following, the number one hundred is used for illustration, and is representative of a company's entire existing customer database. However, it should be appreciated that because a company's customers may number in the tens of hundreds, hundreds of hundreds, or thousands of hundreds, it would be nearly impossible to describe with clarity such a number. Accordingly, in this example, a company is offering a promotion to all their customers. The action is a promotion offering a discount applied to the purchase of a product the company has offered for sale. The discount is either 9% (shown as A1) or 12% (shown as A2). By substituting I (income, age, education) for the subject (Si), and D (discount) for action (Aj) in formula (1);

$$P=G(I,D), \quad (1)$$

where
P=outcome
G=a function of I and D
I=income, age, education
D=discount as a percentage;

certain behavioral patterns can be determined using the information contained within the database, as is shown in the following table which represents information that may be obtained during the offering of the promotion.

| Entire Customer Database | Income/Age/Education | (S) | Offered Discount (A) | Outcome (P) |
|---|---|---|---|---|
| Customer 1 | $60,000, 27, College | (S1) | A1 (9%) | 1 (yes) |
| Customer 2 | $52,000, 30, High School | (S2) | A2 (12%) | 0 (no) |
| Customer 3 | $87,500, 35, Graduate | (S3) | A1 (9%) | 0 (no) |

-continued

| Entire Customer Database | Income/Age/Education | (S) | Offered Discount (A) | Outcome (P) |
|---|---|---|---|---|
| . | | | | |
| . | | | | |
| Customer 100 | $71,500, 24, College | (SN) | A2 (12%) | 1 (yes) |

In this example, customer 1, S1, has an income of $60,000, is 27 years old and has graduated from college, accepted promotion A1 (discount of 9%) when offered, as indicated in outcome (P) as a one. Customer 2, S2, has an income of $52,000, is 30 years old and has graduated from high school, did not accept promotion A2 (discount of 12%) when offered, as indicated in outcome (P) as a zero. Customer 3, S3, has an income of $87,500, is 35 years old and has graduated from graduate school, did not accept promotion A1 (discount of 9%) when offered, as indicated in outcome (P) as a zero. This process is repeated for the remaining customers up to and including customer "one hundred" who has an income of $71,500, is 24 years old and has graduated from college, accepted promotion A2 (discount of 12%) when offered, as indicated in outcome (P) as a one.

It should be appreciated that in the present example, there are business side constrains that can also affect a promotion (A1, A2), e.g., total promotional budget, total number of promotions that can be offered, and the like.

In this example, once the desired data contained within the database of the 100 customers has been extracted, the above table has been completed. The information regarding the customer (S*) and action (A*), where * equates to a resulting action for a corresponding subject, such that the data is a dimensional vector of quantities. Then, by using standard statistical methods, a best function, G, for a training data set may be determined. Linear functions and quadratic functions are two of the more common ways to perform the statistical analysis.

In step 502, a best behavioral model is then determined. The above mentioned vector of quantities, where each vector quantity is representative of a customer, that are obtained from the acquired data contained within the table, are converted to a best behavioral model (also referred to as a best fit) of the defined attributes, which is, in this instance, income, age, and education. It is not uncommon to add up the errors to minimize the total error for the training data set. The best behavioral model can be determined by utilizing well know methods, e.g., linear regression, generalized linear models, neural network and classification and regression trees.

This training data set provides the data from where a function is derived, in this instance, a function G. Function G is expressed, in one embodiment of the present invention, as formula (2).

$$\{G(P=5*I+3*D+E)\}; \quad (2)$$

where
P=outcome
I=income, age, education
5=factor of I
D=promotion as a discount percentage
3=factor of D; and
E=error term value.

Function G, the estimated outcome of the application of action Aj on subject Si, is the best behavioral model based on the training set. This means function G incorporates the greatest number of subjects which fall within the above table, having taken into account all of the predetermined customer attributes or behavioral patterns and promotional criteria as contained within the database. This function therefore becomes the basis for enabling the prediction of behavior of additional customers which fit within the above table.

It should be appreciated that in the above example, three criteria were utilized in the fields of the training set. This was to simplify the description of how the best behavioral model is determined and was obtained utilizing a training set. However, because the above example is shown using only three criteria as factors, the margin of discrepancy within the function would be quite high, shown as error term E in formula (2). Having an error value with a large value will result in a non-best fit, and the information that would be stored in function G would be relatively useless. Therefore, it desirable to have an error term that has the smallest value as is possible.

Following the determination of function G, which is itself a vector representing (Si,Aj), where Si is a three dimensional vector and Aj is a possible action, step 503 is performed, in one embodiment of the present invention. It should be appreciated that function G may consist of conversion probability which, in the current example, could be an average profit. Step 503 is where the training set of step 501 is mapped to function G of step 502. By letting H(Si) represent {G(Si,A1), . . . , G(Si,AK)} and calling the space of H(Si) to be BMS (business metric space), each subject (Si) is mapped to a point in BMS (business metric space), and remain separate points within the BMS.

It should be appreciated that BMS (business metric space) are quantities of, for example, average profit, conversion probabilities, upon which business decisions will be based. These quantities may or may not be directly observable.

Accordingly, in an actual application of the present invention, literally tens, hundreds, or thousands of customer criteria might be included in the mapping of the training set with the best behavioral model, dependent upon the amount of time, space and processing power available to spend obtaining the training set.

Also, other promotions could be included, in addition to the discount percentage as shown from above. Included in the possible action set could be other promotional offers such as, buy one, get one free, a greater discount for multiple purchases of an item, get one item at less cost when another item is purchased, receive a product when a system of products is purchased, extended service agreements, and the like.

While the above example illustrates how the present invention provides a model for predicting an outcome when an action is applied to a subject, which, in this example, is a number equating to an offered discount, the present invention also enables the prediction of several numbers such as, the average profit, the probability of acceptance of the promotion, the cost of coercing the customer to accept the promotion, which are also vectors of numbers. By utilizing the obtained function, in this example, G, this function can be applied to nearly all subsequent customers. It should be appreciated that when another training set is developed utilizing additional customer behavioral patterns, other best fit functions would be utilized in the prediction of an optimal action relative to a different preferred outcome.

Still referring to FIG. 5, in step 504, a random sub-sample of the mapped training set is taken. The random sub-sample provides a reduced volume of data which is then utilized during the determination of an optimized strategy. Because in a real world application, a database may normally contain tens or hundreds of thousands, or millions of customers, a smaller sample is needed. Additionally, because processing the possible hundreds of thousands of customers in the database may be both time and cost prohibitive, the random smaller sample provides an appropriate sampling of the data, while also reducing the processing time and cost to a manageable level when determining an optimized strategy. It should be appreciated that to provide the most comprehensive data, the random sub-sample should incorporate the greatest range of values, such that nearly all possible attributable value ranges and the greatest number of subjects are included.

Continuing to step 505 of FIG. 5, once the random sub-sample is taken, an optimized strategy for the sub-sample is then determined. The optimized strategy includes business side constraints such as, budget, inventory level requirements, current inventory levels, projected shipping costs, estimated delivery dates, costs of promotion offered, and the like. It should be appreciated that nearly any business constraint may be included in the optimized strategy.

Figure 6:
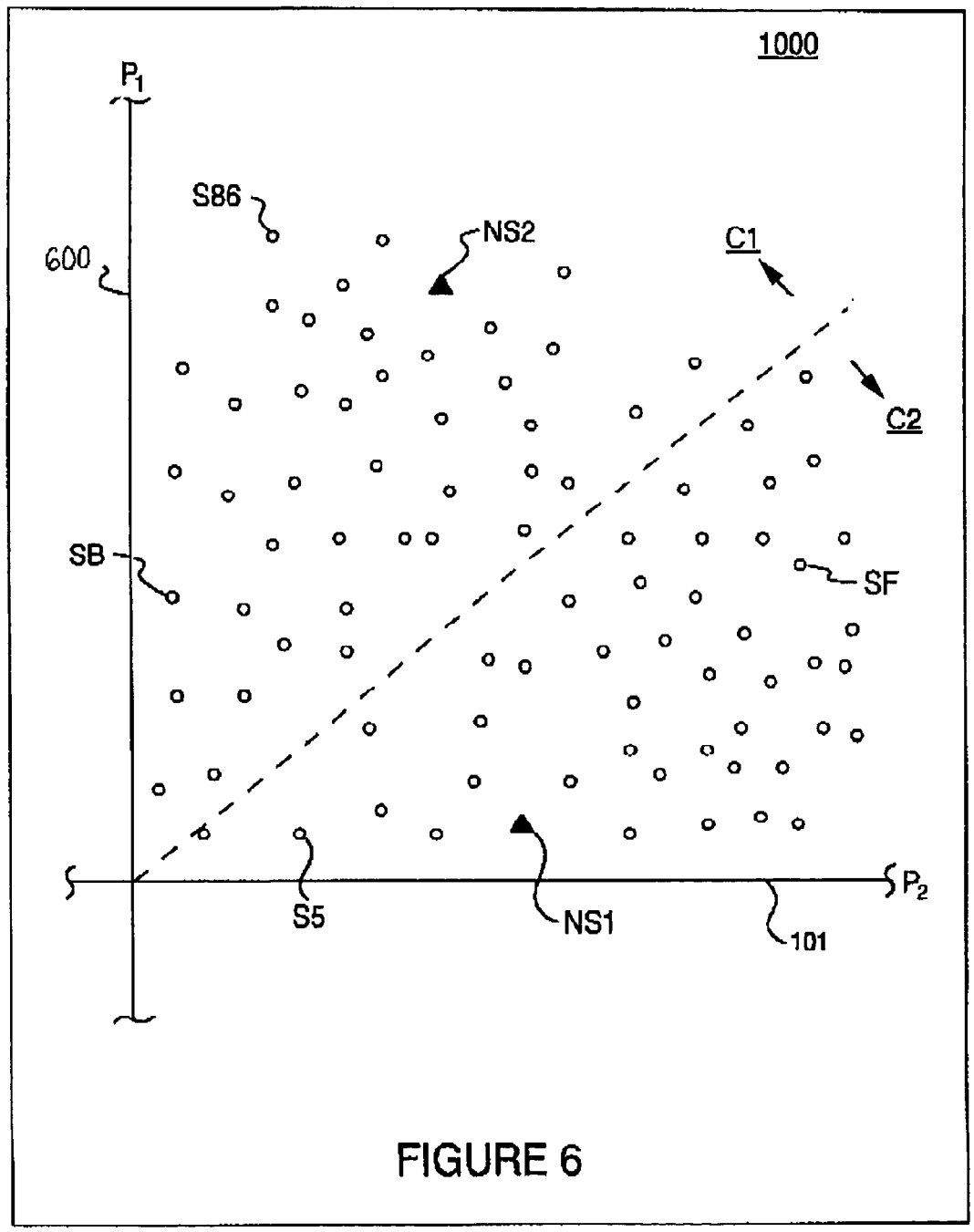
FIG. 6 illustrates an exemplary graph which depicts a mapping of a training set to a best behavioral model, in accordance with one embodiment of the present invention.

To determine the optimized strategy for each subject, each subject is a segment, and the arrival rate for each segment is lambda/N, where lambda is the original arrival rate and N is the number of the subjects in the training set. The optimization problem is solved given the segments H(S1), . . . , H(SN). The result of the optimization is a mapping U from BMS (business metric space) to {A1, . . . , AK}. This provides classification of subjects according to logical divisions within the BMS, as shown in FIG. 6.

It should be appreciated that the result from linear programming may not be assigning 100% of the weight on one action Aj, but that the Aj with the largest weight may be chosen. For example, assume that a company which sells computers has more computers configured for average users, which cost less and generate less profit, than computers configured for high end users, which cost more and generate a greater profit. A customer, having average computing requirements, arrives at the company's web site to purchase a computer. A first reaction would be to sell the most expensive computer, for the largest immediate profit. However, because the customer has average computing requirements, and it would be beneficial to the company to reduce the inventory of those computers configured for an average user, the optimized strategy would be to offer the less expensive computer to the customer.

This optimized strategy provides at least three possible advantages over the first reaction which was to sell the most expensive computer. First, the company achieves a reduction in the excess inventory of the computers that are configured for the average user. Second, the company retains the computer configured for high-end users, so that when a high-end user visits the company's web site, the company is able to offer the computer that the high-end user desires, which creates a possible second sale, because had the average customer been sold the high-end computer, that computer might not have been available when desired by the high-end user. Third, because the average customer purchased a computer that fit their individual requirements while saving money, the average customer is more likely to return and continue as a customer, and as a possible added benefit, the customer may provide word of mouth advertising for the company, extolling the business practices of the computer company.

In step 506 of FIG. 5, the function G and the optimized strategy, the optimal action for each subject in the random sub-sample represented by a point in BMS (business metric space), is stored as, in one embodiment, result 555. This is shown as C1 and C2 in FIG. 6. It should be appreciated that when a different objective of an outcome is desired, which may or may not include different subject attributes, steps 501–506 would need to be repeated.

In step 507, a new subject, labeled NS in one example, has arrived at a company's Website via an on-line connection. The new subject is one who has not visited and registered with the company's Web site, is not known to the company through a warranty registration of a previous purchase of a product offered by the company, and/or is not included in the existent database. Accordingly, the estimation/optimization method of the present invention, GSM (generalized segmentation method), is utilized to find the optimal strategy for the newly arrived subject, NS.

Continuing in FIG. 5, in step 508, result 555, from step 506 is retrieved. This provides the function G and optimized strategy which will be utilized to determine the appropriate classification of NS, the new subject.

In step 509 of FIG. 5, the new subject, NS, is then mapped to the best behavioral model G, where G is the function of the outcome, stated as H(NS), because of the pre-determination of the training set, as described in step 501, and by having the best behavioral model G precalculated, as described in step 502.

In step 510, once the mapping of new subject, NS, is complete, the new subject is then classified according to the logical divisions as described in step 505, and as also shown in FIG. 6, Continuing, in step 511, the optimized strategy for the new subject, NS, is then determined, providing an estimated optimal action relative to the new subject. It is appreciated that the result, U, where U is the optimized strategy for NS, is from linear programming, such that for any j, where j is an applied action on NS, those H(Si) when U(H(Si))=Aj form a convex set. Nearly any pair of such convex sets may be separated by a hyper plane in H. Accordingly, pair-wise classification can be achieved using an SVM (support vector machine).

Referring to FIG. 6, shown is a graph 1000 which is representative of the mapping of the training set to the best behavioral model in BMS (business metric space), as described in step 503 of FIG. 5. In this embodiment, vertical axis line 100 represents P1, which is the estimated probability of the acceptance of promotion A1 (the 9% discount). Horizontal axis line 101 represents P2, which is the estimated probability of the acceptance of promotion A2 (the 12% discount). The small circles represent each of the customers 1 through 100 (S1–SN) of the training set/best behavioral model as described in step 502 of FIG. 5. In this example, there are two classifications, C1 to the left, and C2 to the right. C1 represents the collection of points for which A1 (promotion of a 9% discount) is optimal. C2 represents the collection of points for which A2 (promotion of a 12% discount) in optimal. Accordingly, it can be predicted that a subject having attributes approximating subjects in class C2 will behave as those within class C2, and a subject classified in C1 will behave as those in class C1.

Additionally, still referring to FIG. 6, when new subjects are mapped, such as in step 509 of FIG. 5, those new subjects are easily classified using the pre-existing logical divisions. In FIG. 6, this is shown, in one embodiment, as NS (new subject) 1 and NS (new subject) 2. NS 1 and NS 2 are represented by small solid triangles for easy differentiation from the random sub-sample of subjects S1 to SN.

Still referring to FIG. 6, NS 1 is shown to have attributes that equate to those classified in C2 and NS 2 is shown to have attributes that equate to those classified in C1, and therefore, it can be predicted that NS 2 will behave as those in C1 and NS 1 will behave as those in C2.

Accordingly, when a new customer arrives, and that new customer has attributes that are or are not within the training set parameters, as shown above, the function G and the optimized strategy, from above, may be applied to determine the probability of the new customer being receptive to and possibly accepting the intended promotion. It can also be applied to determine the amount of profit that can be expected from the new customer.

In another example, assume a company markets colored computers and colored accessories for their computers. Utilizing the training set, it can be determined which subjects have purchased which colored computer. It can also be determined, through a best behavioral model, which subjects will or will not accept actions pertaining to their particularly colored computer, when colored accessories are available. By mapping the training set to the best behavioral model, the present invention can then determine classifications of the subjects relative to which colored accessory should be offered to which subject. For example, a subject who has a green colored computer will probably be less likely to acquire a purple colored accessory than a subject who has a purple computer. Accordingly, when a new subject visits, and it is determined that the new subject has a yellow computer, the new subject would be more likely to respond favorably to a promotion offering yellow colored accessories that a differently colored accessory.

While the above simple example illustrates the functionality of the present invention implemented in a business environment directed toward computer products, it should be appreciated that the present invention is equally well suited for nearly any other type of endeavor.

In conclusion, the present invention provides a method and system for estimating appropriate choices relative to the most applicable action. Concurrently, the present invention provides a method and system for approximating an optimal strategy without estimating any high dimensional distribution. Additionally, the present invention separates the statistical estimation step and the optimization step, thereby striking a balance between optimality and tractability.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer system in a computer network, said computer system comprising:

a bus;

a memory unit coupled to said bus; and at least one processor coupled to said bus, said at least one processor for executing a method for action selection based upon an objective of an outcome relative to a subject, said method comprising:
  a) acquiring and storing a training set, said training set an existing database of information, said information are attributes of said subject, wherein said training set is to provide a base of data for said method;
  b) calculating and storing a best behavioral model for predicting said outcome, provided an action is applied to said subject;
  c) mapping of said training set to said best behavioral model within a business metric space, wherein said mapping is subsequently stored;
  d) selecting and storing a random sub-sample of said training set mapped to said best behavioral model, said random sub-sample for reducing computational requirements when determining an optimized strategy; and
  e) determining and storing said optimized strategy for said random sub-sample, said optimized strategy for providing an optimal action relative to said subject for said objective of said outcome.

2. The computer system of claim 1 wherein said subject is a customer of a business entity, said business entity being enabled to interact with said customer in a web based environment, and wherein said action is a promotion offered by said business entity.

3. The computer system of claim 1 wherein the method for action selection based upon an objective of an outcome relative to a subject further comprises:
  allocating a dimensional attribute vector relative to each subject referenced in said database.

4. The computer system of claim 1 wherein the method for action selection based upon an objective of an outcome relative to a subject further comprises:
  deriving a function from said action being applied to said subject, wherein said function equates to said best behavioral model and wherein said function is represented as a dimensional vector.

5. The computer system of claim 1 wherein said subject of said mapped training set is a separate point in said business metric space.

6. The computer system of claim 1 wherein the method for action selection based upon an objective of an outcome relative to a subject further comprises:
  utilizing linear programming to calculate said optimal action, wherein said optimal action is associated with the largest number of subjects.

7. The computer system of claim 1 wherein said optimized strategy provides a logical division for classification of said subject, so as to determine said optimal action of said objective of said outcome, relative to said subject.

8. The computer system of claim 1 wherein a new subject, said new subject not from said training set, is mapped to said best behavioral model and said optimized strategy, such that said new subject is included in a classification of a logical division for classification, said logical division provided by said optimized strategy, so as to provide an optimal action for said objective of said outcome, relative to said new subject.

9. A computer readable medium for storing computer implemented instructions, said instructions for causing a computer system to perform:
  a) acquiring and storing a training set, said training set an existing database of information, said information are attributes of said subject, wherein said training set is to provide a base of data for said method;
  b) calculating and storing a best behavioral model for predicting said outcome, provided an action is applied to said subject;
  c) mapping of said training set to said best behavioral model within a business metric space, wherein said mapping is subsequently stored;
  d) selecting and storing a random sub-sample of said training set mapped to said best behavioral model, said random sub-sample utilized for reducing computational requirements when determining an optimized strategy; and
  e) determining and storing said optimized strategy for said random sub-sample, said optimized strategy for providing an optimal action relative to said subject for said objective of said outcome.

10. The computer readable medium of claim 9 wherein said subject is a customer of a business entity, said business entity enabled to interact with said customer in a web based environment, and wherein said action is a promotion offered by said business entity.

11. The computer readable medium of claim 9 wherein said computer implemented instructions cause a computer system to perform:
  allocating a dimensional attribute vector relative to each subject referenced in said training set.

12. The computer readable medium of claim 9 wherein said computer implemented instructions cause a computer system to perform:
  deriving a function from said action being applied to said subject, wherein said function equates to said best behavioral model, and wherein said function is represented as a dimensional vector.

13. The computer readable medium of claim 9 wherein said subject of said mapped training set is a separate point within said business metric space.

14. The computer readable medium of claim 9 wherein said computer implemented instructions cause a computer system to perform:
  utilizing linear programming to calculate said optimal action, wherein said optimal action is associated with the largest number of subjects.

15. The computer readable medium of claim 9 wherein said optimized strategy provides a logical division for classification of said subject, so as to determine said optimal action of said objective of said outcome, relative to said subject.

16. The computer readable medium of claim 9 wherein a new subject, said new subject not from said training set, is mapped to said best behavioral model and said optimized strategy, such that said new subject is included in a classification of a logical division for classification, said logical division provided by said optimized strategy, so as to provide an optimal action for said objective of said outcome, relative to said new subject.

* * * * *

UNITED STATES PATENT AND TRADEMARK OFFICE
CERTIFICATE OF CORRECTION

| | | |
|---|---|---|
| PATENT NO. | : 7,096,209 B2 | Page 1 of 1 |
| APPLICATION NO. | : 09/854084 | |
| DATED | : August 22, 2006 | |
| INVENTOR(S) | : Tongwei Liu et al. | |

It is certified that error appears in the above-identified patent and that said Letters Patent is hereby corrected as shown below:

In column 5, line 16, delete "60" and insert -- 50 --, therefor.

In column 6, line 5, delete "sever" and insert -- server --, therefor.

In column 7, lines 51-59, delete "As described above, computer system 100 also contains a display device 141 coupled to the bus 130 for displaying information to the computer user. Display device 141 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), electronic paper display, plasma, etc., on screen cursor device 143." and insert -- Also included in computer system 100 of Figure 3 is an optional alphanumeric input device 142. In one implementation, e.g., when utilized in handheld computer system 80, device 142 is a handwriting recognition pad ("digitizer"). In another implementation, e.g., when utilized in either laptop computer system 81 and/or desktop computer system 82, device 142 is a keyboard. Alphanumeric input device 142 can communicate information and command selections to processor 131. --, therefor.

In column 18, line 2, in Claim 9, delete "existing" and insert -- existent --, therefor.

Signed and Sealed this

Twentieth Day of April, 2010

David J. Kappos
*Director of the United States Patent and Trademark Office*